Oct. 28, 1941.    A. SENAUKE    2,260,585
AMPLIFICATION AND MODULATION
Filed March 30, 1938    4 Sheets-Sheet 1
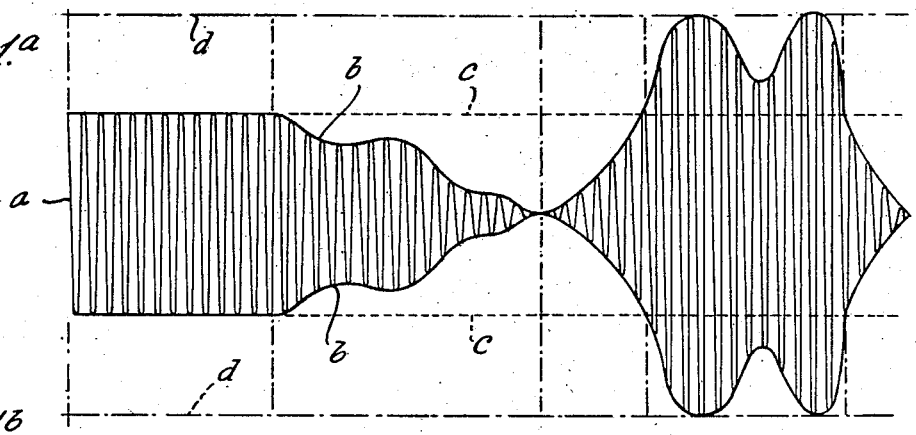
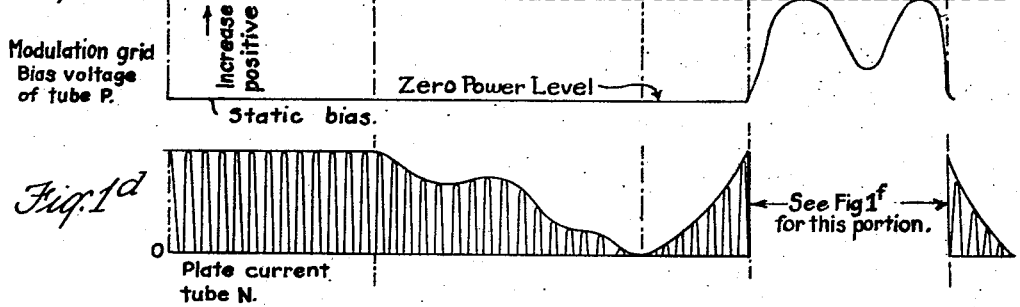
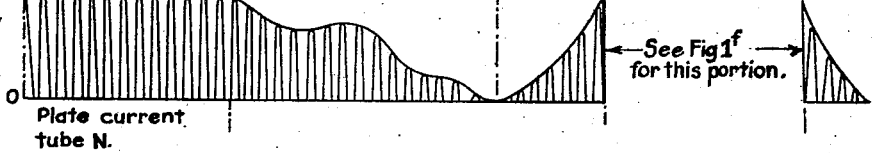
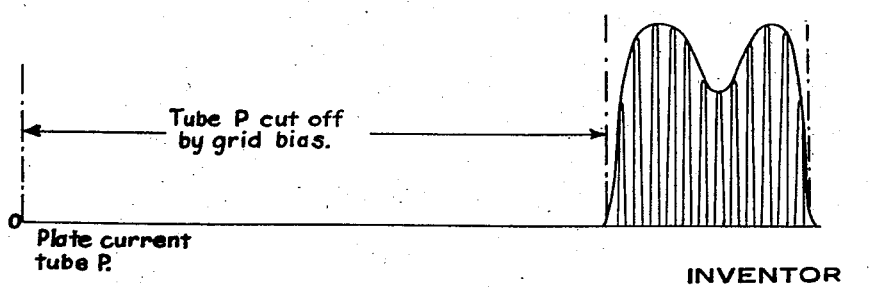
INVENTOR
ALEXANDER SENAUKE.
BY
ATTORNEY Oct. 28, 1941.                A. SENAUKE                    2,260,585
AMPLIFICATION AND MODULATION
Filed March 30, 1938              4 Sheets-Sheet 2
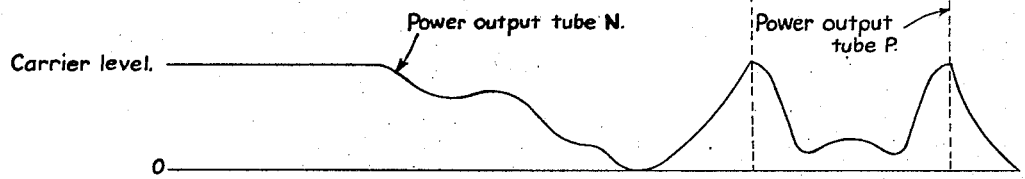
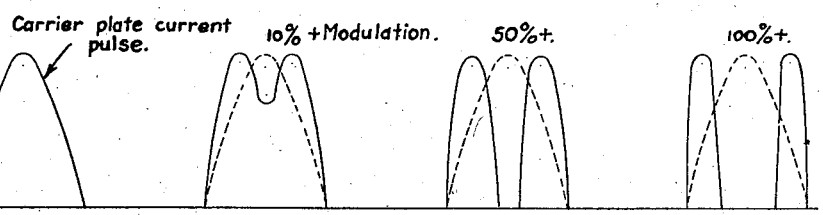
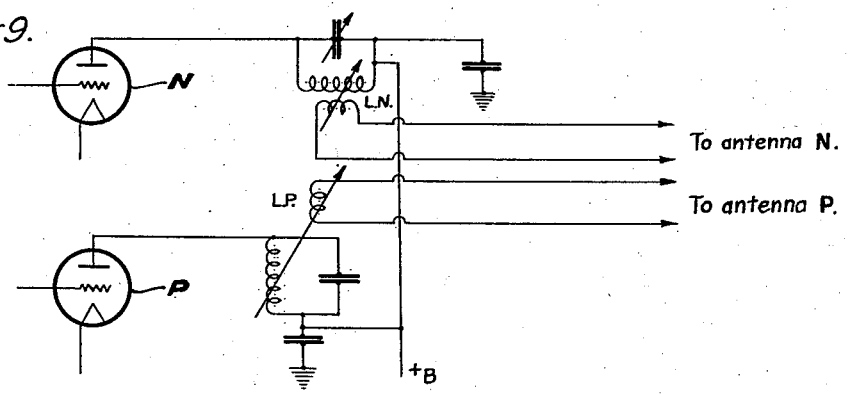
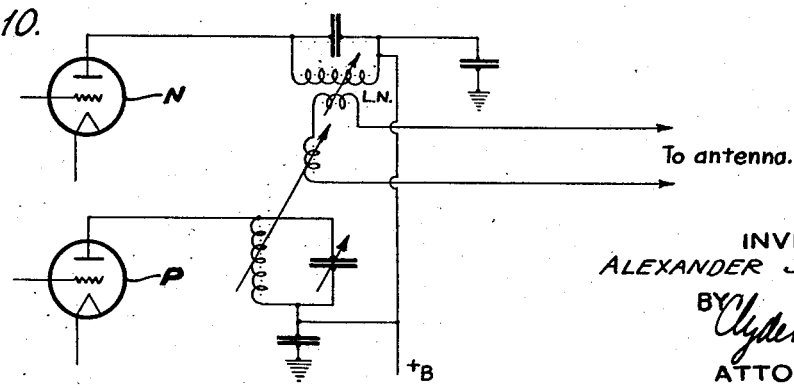
INVENTOR
ALEXANDER SENAUKE
BY
ATTORNEY Oct. 28, 1941.  A. SENAUKE  2,260,585

AMPLIFICATION AND MODULATION

Filed March 30, 1938  4 Sheets-Sheet 3

INVENTOR
ALEXANDER SENAUKE.
BY Clyde W Norton
ATTORNEY

Oct. 28, 1941.  A. SENAUKE  2,260,585
AMPLIFICATION AND MODULATION
Filed March 30, 1938  4 Sheets—Sheet 4
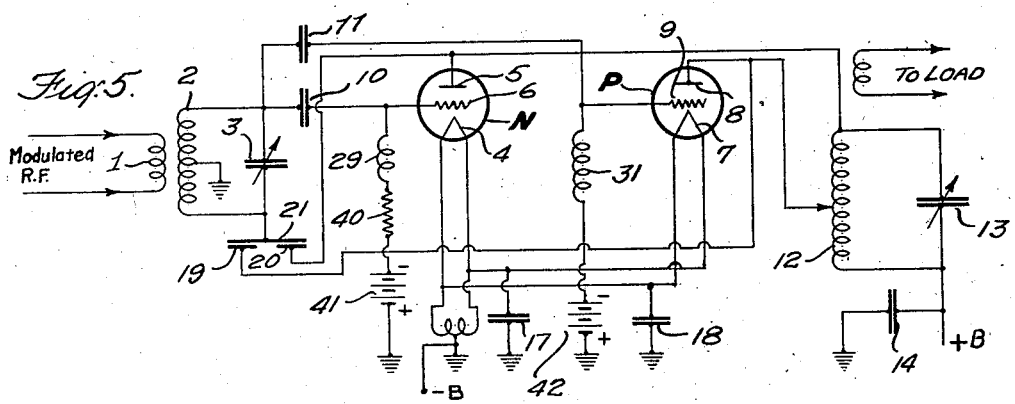
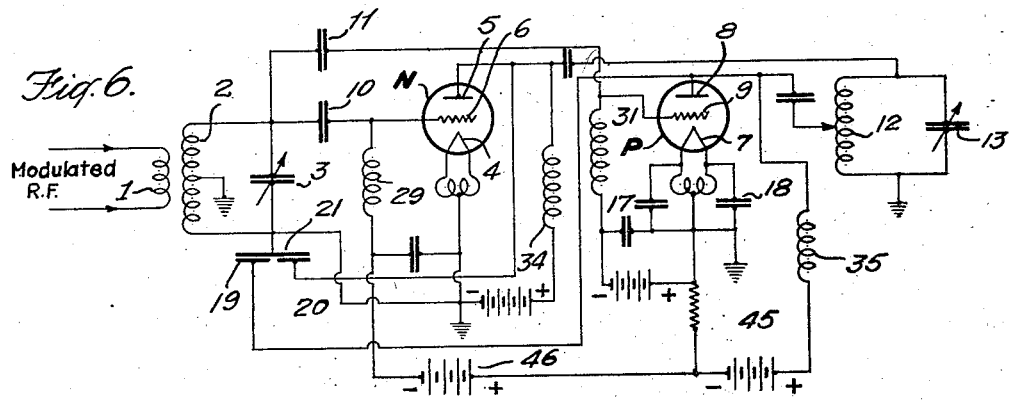
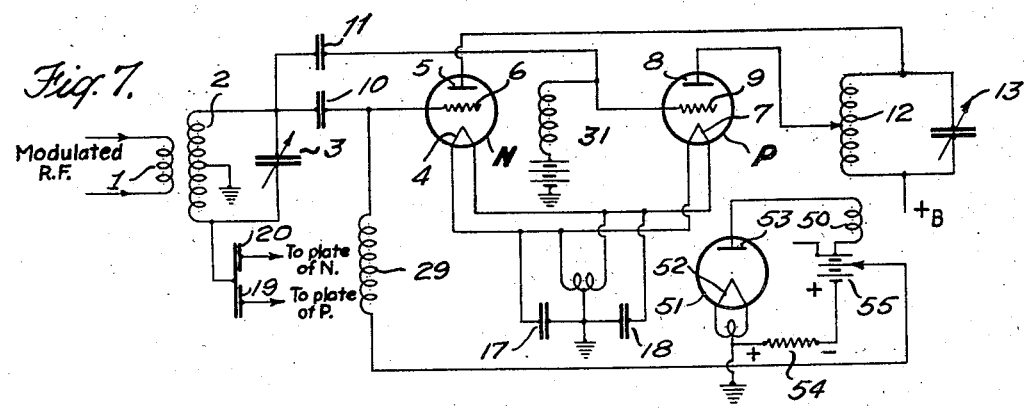
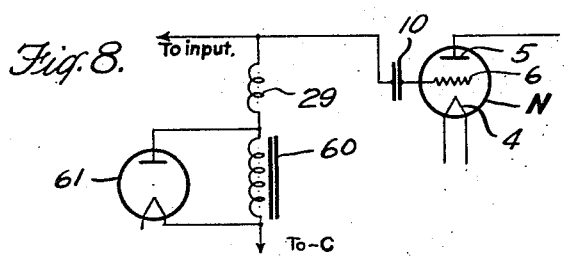
INVENTOR
ALEXANDER SENAUKE
BY Clyde W. Norton
ATTORNEY Patented Oct. 28, 1941

2,260,585

UNITED STATES PATENT OFFICE 2,260,585

AMPLIFICATION AND MODULATION

Alexander Senauke, New York, N. Y., assignor to AmpereX Electronic Products, Inc., Brooklyn, N. Y., a corporation of New York Application March 30, 1938, Serial No. 198,889

11 Claims. (Cl. 250—17)

This invention relates to methods and apparatus for amplifying and modulating electric waves and for amplifying already modulated waves such as are employed in radio and carrier current communication systems.

Among the objects of my invention are the following:

To provide a method and apparatus for producing so-called grid-bias modulation and amplification operating at relatively high plate efficiencies, of the order of 60 to 80%;

To provide apparatus for producing linear power amplification of a completely or 100% modulated super-audible frequency oscillation, operating with relatively high plate efficiency, of the order of 60 to 70%;

To provide a method and apparatus for driving an oscillatory circuit with a completely (100%) modulated oscillation of its own frequency, in which the tubes are so arranged and operated as to permit the utilization of tubes of considerably lower power rating for a given load than has heretofore been the case;

To provide circuits employing the tubes for the purposes stated in a manner that assures the desired high levels of efficiency, and prevents the development of conditions which would tend to impair the quality of the output or lower the efficiency obtained;

To provide means for driving a common load circuit by means of a plurality of tubes or groups of tubes, one tube or group of tubes only furnishing the driving power when the output required is less than a predetermined value, and the other tube or groups of tubes furnishing power only when the demand exceeds a predetermined value, the transition being accomplished automatically under the control of the waves or waves impressed on the input of the system;

To provide means whereby a plurality of tubes or groups of tubes requiring different impedances may supply a common load by tapping said load at proper points, or by coupling to said load by different couplings, or by adjustment of the tube plate voltages; and To provide certain novel methods of connecting and employing tubes to produce the results mentioned.

Still other objects will be apparent from the specification.

In this application I have particularly pointed out and distinctly claimed the part, improvement or combination which I claim as my invention or discovery, and I have explained the principles thereof and the best mode in which I have contemplated applying those principles so as to distinguish my invention from other inventions.

In the drawings:

Fig. 1, comprising parts 1a, 1b, 1c, 1d, 1e, 1f, and 1g, shows graphically the principles of my invention, Fig. 1a being a diagrammatic showing of a 100% modulated carrier wave, Fig. 1b showing the variation in grid bias on tube N, Fig. 1c the variation in grid bias on tube P, Fig. 1d showing plate current of tube N, the portion of this curve covering the time when tube P is acting being omitted from 1d and being reproduced on a larger scale in Fig. 1f for purposes of clarity, Fig. 1e showing the plate current in tube N, Fig. 1f showing, on an enlarged scale, the plate current of tube N in a portion of the interval left blank in Fig. 1d, and Fig. 1g being power output curves of tubes N and P plotted on the same axes, all of the curves being qualitatively, but not quantitatively, plotted for the portion of the carrier wave shown in Fig. 1a;

Fig. 5 is a circuit diagram of a linear power amplifier for the amplification of a modulated carrier oscillation;

Figs. 6 and 7 are circuit diagrams of alternative forms of apparatus of the type of that shown in Fig. 5;

Fig. 8 is an alternative form of circuit which may be used to protect tube N against excessive grid current on positive modulation; and Figs. 9 and 10 being alternative forms of load supply.

In the various figures, like reference numbers indicate like parts.

In accordance with my invention, I employ two tubes or groups of tubes, one (the N tube) supplying the major portion of power during negative modulation, the other (the P tube) supplying the power during positive modulation, this being accomplished by providing that the tube or tubes active in negative modulation deliver their peak power at zero modulation (carrier level) and never deliver any greater power (see Fig. 1d). They will, however, deliver less with increase in negative modulation, reaching zero power delivery at negative peak modulation.

The other tube (or group of tubes) comes into action during positive modulation, delivers the major portion of the power during positive modulation and delivers no power during negative modulation (see Fig. 1e). While the negative tube or tubes do deliver some power during positive modulation, this power is always only a small part of the total power during positive modulation, and, generally speaking, the actual amount of power delivered by the N tubes decreases with increase in positive modulation, as shown in Fig. 1g.

Figure 2:
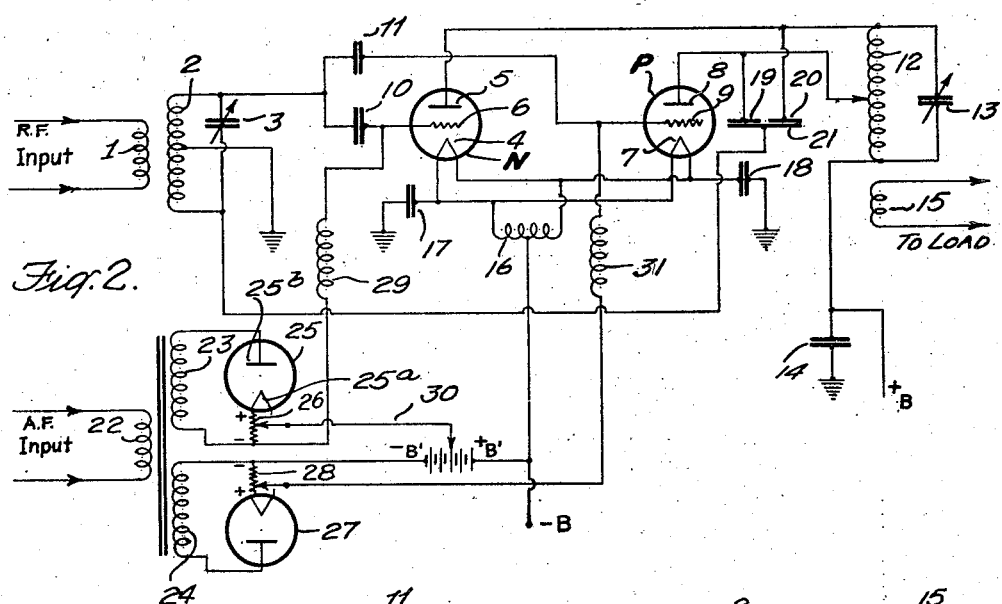
Fig. 2 is a circuit diagram of a grid-bias modulated amplifier according to one form of my invention, the apparatus being shown in its most complete form to aid in the understanding of my invention.

Referring now more particularly to Figs. 1 and 2, Fig. 1a represents a small time section of a carrier wave, varying in amplitude within the envelope b—b, representing a lower frequency or frequencies, usually sound; dotted lines c—c represent the constant amplitude of the carrier when no modulation is being supplied, as when no sound is impinging on the microphone; dot-and-dash lines d—d represent the maximum amplitude of the carrier (by definition of 100% modulation, the maximum amplitude d is twice that of amplitude c).

As will be understood, the amplitude of the carrier, when modulated, may be rapidly varying between zero and amplitude d, in a very complicated manner, determined by the modulating frequencies. When the carrier amplitude exceeds the limit c, the modulation is said to be positive; when less than c, negative. These terms will be used herein with those meanings.

Also, these tubes or groups of tubes may feed a common load circuit, and usually the tubes will require different impedances. I have provided various arrangements by which the load impedances may be properly related to the tubes.

This invention differs from other proposed schemes for obtaining high efficiency grid modulation, in which the plate voltage and static bias are made to expand partially at a syllabic rate to allow of positive modulation, or for providing high efficiency linear amplification by the same means or by means of a variable load impedance which is made to decrease in effective value for positive modulation requirements by the action of an auxiliary tube or tubes.

Referring first to Fig. 2, the carrier frequency oscillation, which may at this point have a relatively low power, is supplied from any suitable driving source to a coil 1, which may be coupled to coil 2 shunted by condenser 3, the same forming a tuned input circuit common to tubes N and P, the tube N being the negative modulation tube, the tube P the positive modulation tube. Each of the tubes is herein indicated as a triode, with which very satisfactory results have been obtained, although it will be understood that other types of tubes may be employed, and that a group of tubes in parallel may be employed both for N and P tubes.

Tube N may comprise cathode 4, anode 5 and control electrode or grid 6. Similarly tube P may comprise cathode 7, anode 8 and control electrode 9.

From the tuned circuit formed by inductance 2 and condenser 3, a connection may be made to the grid of the tube N through condenser 10, and a similar connection through condenser 11 to the grid 9 of the tube P. The plate 5 of tube N may be connected to one terminal of inductance 12 shunted by a variable condenser 13, the said inductance 12 and condenser 13 forming the output tank circuit. The other terminal of inductance 12 may be connected to the positive terminal of a source of space current for energizing the tubes N and P, which source is omitted for simplicity, and one side of the tank circuit may be grounded through condenser 14, as shown.

Coupled to inductance 12 I may provide inductance 15, which may be connected to any suitable load circuit, such, for instance, as an antenna and ground (not shown). The plate 8 of tube P may be connected to the mid-point (or a variable point) of inductance 12, said connection providing for energy from tube P to reach the tank circuit and serving also to connect the plate 8 to the source of plate current B. This connection of the plates of tubes N and P at different points on the tank circuits allows of properly relating the impedance of the tank circuit as seen from the plate, to the respective tubes N and P which may require different load impedances.

The cathodes 4 and 7 may be heated in any suitable manner (not shown), and the opposite conductors feeding the filament may be grounded through condensers 17 and 18 respectively. Since the tubes shown may have substantial grid-plate capacity, it may be desirable to provide means for preventing oscillation thereof (since the grid and plate circuits are preferably tuned to the same frequency), and this may be readily accomplished by twin neutralizing condenser consisting of plates 19 and 20 respectively connected to the plates of tubes P and N and having a common cooperating plate element 21 connected to the low side of inductance 2, the mid-point of which may be grounded.

The audio signals with which it is desired to modulate the carrier may be supplied from any suitable source to primary winding 22 of audio transformer having a pair of secondary windings 23 and 24. The secondary windings 23 and 24 serve to provide bias voltages for the tubes N and P respectively to control the operation of the apparatus.

One way in which this may be accomplished is by connecting in series across the secondary winding 23 a rectifier 25, which may be of the Fleming valve type, having a cathode 25a and an anode 25b, in series with resistance 26. I may likewise connect across the secondary winding 24 a second rectifier 27 having a cathode 27a and an anode 27b, the said rectifier being in series with resistance 28.

It will be understood that, since current flows in one direction only through these rectifiers, whenever an audio frequency current is impressed on winding 22, current will flow through the resistances 26 and 28, each of these currents being a pulsating uni-directional current, and causes a corresponding uni-directional voltage (IR drop) across the resistances. From the negative terminal of the resistance 26 we may provide a connection to the grid 6 of tube N through radio frequency choke 29 and a return thereof to the cathode through variable tap 30 engaging resistance 26 and connecting to a suitable point on the battery B', the said battery serving to provide fixed bias for the grids of the tubes P and N (the term "fixed" being used in the sense that the bias voltage is not controlled by the signal, but, of course, it will be adjusted to the desired value). To provide the bias on tube P the negative side of resistance 28 may be connected to the positive terminal of the battery B' and a variable tap on resistance 28 connected to the grid of tube P through radio frequency choke 31.

The magnitudes of the radio frequency grid input voltage and the respective fixed grid biasing voltages for tubes N and P are so related that when the audio frequency voltage is zero, tube N is delivering the required carrier power to the common load circuit with a high plate efficiency and tube P is delivering zero or negligible power. This condition will obtain if the fixed biasing voltage for tube N is lower than the peak value of the radio frequency grid voltage and the fixed biasing voltage for tube P is equal to or sufficiently larger than the peak value of the radio frequency grid voltage to prevent any appreciable plate current flow.

The low frequency bias voltage which produces the modulation will be seen to be supplied in series with the fixed biasing voltage and it will be seen that in either case, that is, either for tube N or P, it represents a voltage added algebraically to the fixed bias voltage derived from battery B' and, although uni-directional, fluctuates in value with the audio signal. The direction or phasing of the modulation bias voltage of tubes N and P is so chosen that it can only increase the bias on tube N and decrease the bias on tube P. This will be clear from Figs. 1b and 1c.

Tracing the bias circuit on tube N it will be observed that the grid 6 is negative with respect to the cathode by the amount of the potential of battery B' included and that the grid is made still more negative with respect to the cathode by the amount of the drop through resistance 26, if any. Thus, as the audio frequency current increases in negative modulation, the grid 6 will go still more negative with respect to its cathode and the space current of tube N will be decreased.

On the other hand, tracing the bias circuit for tube P, it will be seen that while the grid tends to be made negative with respect to its cathode by the amount of the potential of battery B', the voltage drop through resistance 28 is applied in the opposite direction so that with increase in audio frequency current for positive modulation, the potential of the grid 9 moves in a positive direction with respect to its cathode.

Audio currents which cause negative modulation cannot change the bias on tube P, and audio currents which cause positive modulation cannot change the bias on tube N, because rectifiers 25 and 27 pass current only in the direction corresponding to negative modulation and positive modulation respectively.

The magnitude of the audio frequency voltage should be so related to the magnitudes of the fixed biasing voltage, the constant radio frequency grid voltage (the actual amount of which, supplied to tubes N and P, may be controlled by taps (not shown) from condensers 10 and 11 to variable points on coil 2), the effective plate load impedance provided by the common tank or load circuit, and the characteristics of the tube, that at the maximum peak audio voltage to be supplied, the power output of tube P will approach four times the carrier power supplied by tube N under static bias conditions (no sound input). Under this positive peak condition the power output of tube N will be small because its instantaneous plate voltage for part of each radio frequency cycle has become negative (see Fig. 1f), interrupting the plate current pulse which that tube would otherwise deliver. At maximum peak positive modulation, the total power delivered to the tank circuit is the value required to make the peak radio frequency voltage across the entire tank circuit twice its carrier (zero modulation) value. Under the conditions of high efficiency adjustment, this value of the peak radio frequency voltage will exceed the direct current plate voltage on tube N by values up to 80% of the direct current plate voltage on tube N, and when the modulation is positive and at the instant when the radio frequency grid driving voltage is at its maximum positive value, the polarity of the radio frequency tank voltage will be opposite that of the direct current plate supply voltage of tube N and the effective plate-filament voltage of tube N will be negative, and may be as much as 80% of the battery voltage in magnitude. The point between carrier amplitude c and peak amplitude at which the plate of tube N goes negative with respect to its cathode and the tube ceases supplying power completely, will be determined by the choice of the various variable factors.

I use the terms "positive audio" and "negative audio" in the same sense as positive and negative modulation; that is to say, audio currents which cause positive modulation (greater than unmodulated carrier amplitude) are called "positive audio," those which cause negative modulation (less than unmodulated carrier level) are called "negative audio."

For positive audio conditions, the power delivered by tube P must be so proportioned as to make the total power delivered by both tubes N and P vary as the square of the ratio of the instantaneous radio voltage to the maximum peak voltage plus 1; or $$W_{1+2} \sim \left(\frac{E_i}{E_m}+1\right)^2$$

Work done with practical tubes shows that this requirement is readily obtained in practice by suitably relating the many variable factors provided by this circuit.

During negative audio, tube P remains inoperative and the effective bias on tube N is increased so that the power it delivers to the tank circuit or load is reduced. The magnitude of the negative audio swing of bias is adjusted so that under maximum audio conditions the negative peak audio swing on tube N increases its total effective bias to a value sufficiently greater than the peak radio frequency grid voltage to reduce the power output of the tube N to zero (see Figs. 1a, 1b and 1d). Between the limits of zero output at the "maximum negative audio peak" and "zero audio" (no sound input), the power delivered by tube N must also vary in accordance with $$W_1 \sim \left(\frac{E_i}{E_m}+1\right)^2$$

with $E_i$ negative. This condition is also readily obtained in practice.

This circuit combination affords a very high operating efficiency during carrier conditions (no modulation) and a high average efficiency while the output is modulated, yet requires a negligible amount of audio power for modulating purposes. As compared with conventional modulated amplifiers it may be considered as offering the operating efficiency of a plate modulated amplifier, with the minimized audio power requirements of the conventional grid bias modulated amplifier (which has only half the operating efficiency). Practically, tube P may have a rather low average power handling capacity, though its peak power handling ability must be equal to that of a plate modulated tube of corresponding carrier output rating. Tube N may have peak power handling capacity no greater than the required carrier power and it need have a radio frequency voltage tolerance only approximately 75% of that required of similar tubes carrying an equal carrier rating for plate modulation use.

In specially designed tubes, these requirements may be met with a total tube investment only slightly greater than the cost of the radio frequency tubes only of a plate modulated amplifier. With conventional tubes the cost may be double that of the radio frequency tubes only of a plate modulated radio frequency amplifier, which still will make the cost only about half of that of a conventional linear or grid-bias modulated amplifier of the same capacity.

Figure 3:
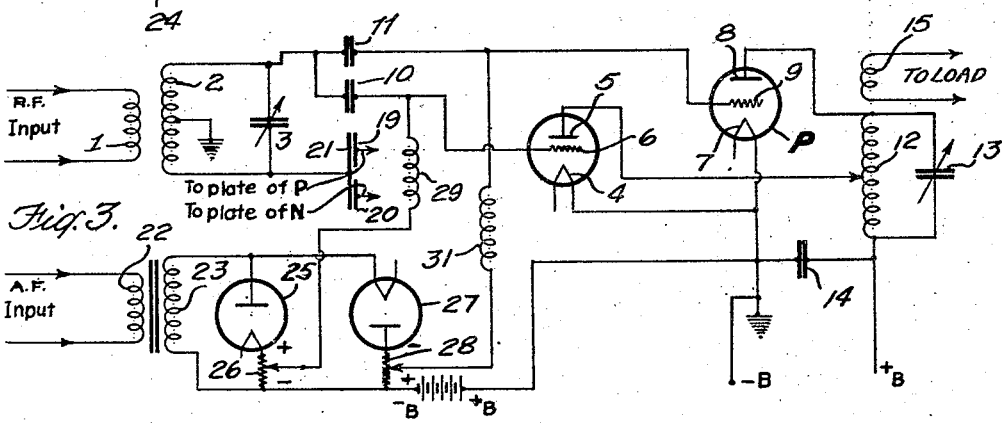
Figs. 3 and 4 are circuit diagrams of alternative forms of apparatus of the type of that shown in Fig. 2.

By suitable choice of tubes N and P, especially as regards their respective amplification constants and mutual conductances, as for instance by using a low μ tube for tube N and a high μ tube for tube P, the bias and audio modulation requirements may be simplified as follows:

As shown in Fig. 3, it will be noted in this instance that two secondaries are no longer employed, the primary 22 being provided with a single secondary 33, the rectifiers 25 and 27 and resistances 26 and 28 in series with the respective rectifiers being connected directly across the winding 33, but in opposite directions. The operation of the circuit in principle, aside from these changes, is the same as that described with reference to Fig. 2 and, it is thought, need not be repeated.

Figure 4:
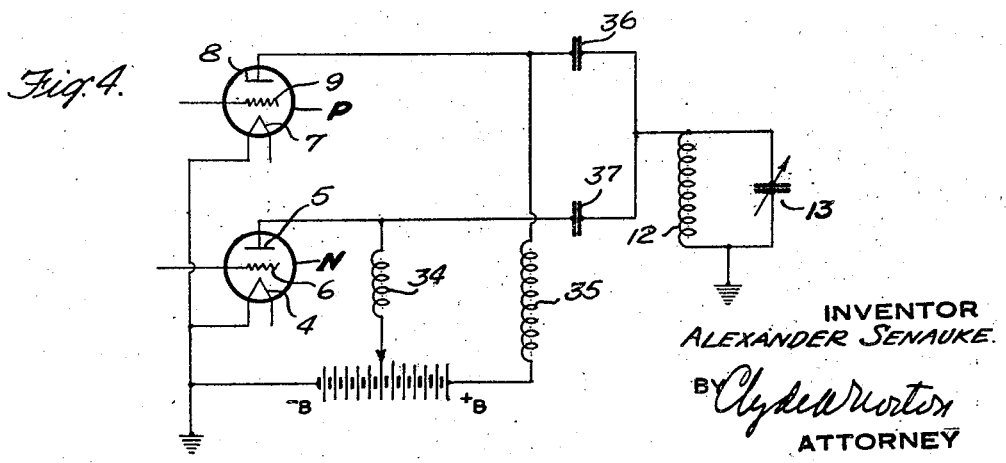

If desired, tubes N and P may be operated with different plate voltages, as indicated in Fig. 4, the plate of tube P being supplied through radio frequency choke 35 and the output current being fed through condenser 36 to the tank circuit and the plate of tube N being operated at a lower potential through radio frequency choke 34 and its output fed to the tank circuit at the same point at which tube P feeds the tank circuit, and this common point feed may be employed with any of the circuits shown, provided the tube impedances are propelry related by choice of the proper plate voltages.

While I have shown the rectifiers 25 and 27 for simplicity in explaining the action of the system, it should be understood that the same are not actually necessary and may be omitted, together with resistances 26 and 28, tap 30 then connecting to the upper terminal of secondary 23 in Fig. 2, and the grid return of tube P being connected to the upper terminal of secondary 24.

Similarly, in Fig. 3 the grid returns of tubes N and P may be brought directly to the upper terminal of secondary 33 and rectifiers 25 and 27 and resistances 26 and 28 omitted.

The reason for this is that the simultaneous self-rectification of tubes N and P themselves may serve the purpose of rectifiers 25 and 27. On positive modulation, an increase in the positive swing of the grid of tube N has no effect, because at carrier level all the current that tube can pass is flowing through the plate circuit, and it is only necessary to protect the tube against excessive grid current flow. Various means by which this may be done are shown and explained hereafter.

For negative modulation, the negative voltage on the grid of tube P resulting from negative audio swings makes no difference, because that tube is already biased to cut-off at zero modulation.

It may be noted that tubes N and P may be arranged for push-pull or push-push operation; that is to say, instead of having their input and output circuits connected both on the same side of ground, they may be connected on opposite side of an intermediate ground and plate circuit supply connection on the input and output circuits respectively.

Referring now to Fig. 5, the principles of my invention are shown in that figure as applied to a high efficiency linear amplifier, arranged to provide power amplification for a modulated radio frequency wave applied to the input circuit. The circuit herein shown is essentially, insofar as the operation of tubes N and P and the circuit arrangement pertaining thereto is concerned, the same as that in the previous figures, with the exception that in this instance biasing voltages are not generated by the action of separate rectifiers. In this instance it will be noted that the bias on the grid 6 of tube N is provided through radio frequency choke 29 and self-biasing resistor 40 and an initial fixed biasing source of potential 41. The bias for tube P may be provided through radio frequency choke 31 and fixed biasing source of potential 42. The modulated radio frequency wave may be supplied through input coil 1 and through the tuned circuit consisting, as before, of inductance 2 and condenser 3.

The tube N in this instance is so adjusted as to its static or fixed bias potential and effective plate load resistance (which may be controlled by adjustment or choice of the turns of coil 12 in the tank circuit) so as to operate as a class B amplifier with peak efficiency under carrier conditions; that is to say, with neither negative nor positive modulation on the incoming wave. The tube P, on the other hand, is given such a static or fixed bias that under carrier conditions its plate current is zero. Its plate load impedance is adjusted by means of the tap on the tank coil 12 so that under peak or maximum positive modulation conditions it will function as a class C amplifier of high efficiency to deliver to the tank circuit the additional power required to double the total radio frequency tank circuit voltage.

The tube N should be provided with means to prevent a destructive rise in its grid power loss during positive modulation periods. This may be accomplished in a number of ways. For instance, this tube may be of a low μ type so operated that under carrier conditions, i. e., neither negative nor positive modulation, its grid current will be relatively low or zero, i. e., the instantaneous peak grid voltage being just equal to or only slightly greater than the static bias voltage. Under these conditions its static direct current bias may be supplied through a very high resistance 40, which is not by-passed for audio frequencies, or a low grid current tube (one having high secondary grid emission) may be used, protected as before by an un-by-passed high resistance.

When the driving radio frequency voltage rises during positive modulation so that the grid starts running positive and drawing current, this current flow through resistance 40 will produce a self-biasing voltage tending to limit the grid current. On negative modulation the tube P will not function since it will be remembered that a radio frequency driving voltage equal to the unmodulated carrier voltage is required to overcome its cut-off bias.

Another way of providing a protecting over-bias for tube N for positive modulation is shown in Fig. 6, which differs from Fig. 5 in that the rising space current of the tube P is employed to furnish the protecting over-bias for the tube N. In this instance, resistance 45 is shown as connected in the space current path of tube P, with a connection through biasing source 46 and through radio frequency choke to the grid of tube N.

As the cut-off bias of tube P is overcome when positive modulation is applied, the increase in space current flowing through resistance 45 produces an IR drop tending to make the lower end of resistance 45 more negative than the upper end, and this voltage is applied to the grid of tube N. It should be noted that in this case the resistance 45 should be relatively small so as not to appreciably affect the operation of tube N on negative modulation. It will be noted that this arrangement requires a separate plate supply for the tubes N and P.

Still another way of providing the over-bias for the tube N is indicated in the circuit of Fig. 7, wherein an inductance 50 is shown coupled to the tank circuit to be excited by the current flowing therein. In circuit with the coil 50 there may be provided a rectifier 51, which may be of the Fleming valve type, having cathode 52 and anode 53, and with its circuit completed through resistance 54 and source of potential 55. The grid return in tube N in this instance after passing through radio frequency choke 29 may be taken to a variable tap on the source 55. When the tank circuit begins to draw current, a voltage is produced in coil 50. When this voltage is great enough to overcome the voltage of battery 55 (which is so poled as to oppose said voltage), rectifier 51 begins to draw current. This produces a voltage drop through resistance 54 of the polarity indicated, and tending to make the grid of tube N more negative with respect to its cathode. By adjustment of the various values, this bias, which increases negatively with increase in tank circuit current, may be made to protect tube N against excessive grid current.

Still another way of protecting tube N against excessive grid current is shown in Fig. 8. In this instance I may interpose in the grid return an audio frequency choke 60, shunted by rectifier 61, which may be of the Fleming valve type.

When the grid is swung positive, as long as no substantial grid current flows, the plate of rectifier 60 is positive with respect to its cathode, and it forms in effect a short-circuit around choke 60, permitting negative modulation.

On positive modulation, as the grid begins to draw current, that current passing through choke 60 makes the plate of rectifier 61 negative with respect to its filament, terminating the flow of current therein, and choke 60 acts as a self-biasing impedance protecting tube N against excessive grid current.

In this connection it should be understood that resistances 26 and 28 shown in Figs. 2 and 3 may, if desired, be audio frequency chokes.

Also, while I have referred to the tubes N and P as energizing a common load circuit or tank circuit, it may be pointed out that my invention may be beneficially employed when the receiver itself is the common load circuit; that is to say, the tube N may feed a tank circuit and an antenna so that the antenna radiates only in response to operation of tube N, as shown in Fig. 9. A second antenna may be provided with its associated tank circuit driven by tube P. It is desirable in this case, however, that the two antennas which, for convenience, may be termed the N antenna and the P antenna, are so placed and arranged that insofar as reception is concerned the receiver is actuated by both antennas equally. If this condition is fulfilled the received signal will then be identical with a signal received from a single antenna located at the same point.

Also, if found desirable, separate tank circuits may be used for the N tube and for the P tube, the said tank circuits preferably being arranged so as to have substantially zero coupling between them, in and of themselves, and each tank circuit may be coupled in series to a single load circuit, such as a single antenna, as shown in Fig. 10, the load impedance being properly related to the tubes by choice and adjustment of the various constants, including the coupling between the respective tank coils and the load coils LN and LP.

While I have shown and described certain preferred embodiments of my invention, it will be understood that modifications and changes may be made without departing from the spirit and scope of my invention, as will be understood by those skilled in the art.

I claim:

1. In a system for supplying amplified super-audible frequency electric waves modulated at a lower rate, in combination, a plurality of vacuum tubes having their input circuits fed in phase from a common source, said tubes having their output circuits coupled together, a load circuit fed by said tubes, a tank circuit interposed between said load circuit and said tubes, an energy transfer path from one of said tubes to said tank circuit for driving the same, a second energy transfer path from another of said tubes to said tank circuit, said paths being connected to said tank circuit at points where the radio frequency voltages in said tank circuit are different and forming a voltage transfer path between said tubes impressing on said second tube from said tank circuit a voltage in excess of that impressed on said tank circuit by said first tube.

2. In a system for supplying amplified super-audible frequency electric waves modulated at a lower rate, in combination, a plurality of vacuum tubes having their input circuits fed in phase from a common source, a load circuit fed by said tubes, a tank circuit interposed between said load circuit and said tubes, a circuit from one of said tubes, said circuit including a portion of said tank circuit, a second circuit from another of said tubes, said second circuit including a portion of said tank circuit, said circuits including unequal impedances in said tank circuit.

3. In a system for supplying amplified super-audible frequency electric waves modulated at a lower rate, in combination, a plurality of vacuum tubes having their input circuits fed in phase from a common source, said tubes having their output circuits coupled together, a load circuit fed by said tubes, means for causing part but not all of said tubes to deliver the major portion of output power to said load circuits during negative modulation, and means for causing the balance of said tubes to deliver the major portion of power to said load circuit during positive modulation, said balance of said tubes being connected to the first mentioned part of said tubes through a voltage step-up path to render the plate of the first mentioned part of said tubes negative with respect to the cathode thereof when the said balance of said tubes is delivering more than a predetermined amount of power.

4. In a system for supplying amplified super-audible electric waves modulated at a lower rate, in combination, a plurality of vacuum tubes having their input circuits fed in phase from a common source, said tubes having their output circuits coupled together, a load circuit fed by said tubes, means for causing a first portion of said tubes to deliver power, during negative modulation, substantially proportional to $$\left(\frac{E_i}{E_m}+1\right)^2$$

where $E_i$ is negative, and for causing a second portion of said tubes to deliver power, during at least a part of the period of positive modulation, substantially proportional to $$\left(\frac{E_i}{E_m}+1\right)^2$$

where $E_i$ is positive, said means comprising a voltage path between the plate elements of the tubes of the first and second portions, said path providing a voltage step-up in the direction from the second to the first portion, $E_i$ represents the instantaneous radio frequency voltage and $E_m$ is the maximum peak radio frequency voltage.

5. In a system for supplying amplified super-audible electric waves modulated at a lower rate, in combination, a plurality of vacuum tubes having their input circuits fed in phase from a common source, said tubes having their output circuits coupled together, a load circuit fed by said tubes, means for causing part only of said tubes to deliver power, during negative modulation, substantially proportional to $$\left(\frac{E_i}{E_m}+1\right)^2$$

where $E_i$ is negative, and for distributing the load between said tubes so that on positive modulation the delivered power is always substantially proportional to $$\left(\frac{E_i}{E_m}+1\right)^2$$

where $E_i$ is positive, said means comprising means for rendering one of said tubes inoperative during negative modulation, means for increasing the bias in a negative direction on a second tube during negative modulation, means for rendering the first tube operative during positive modulation, and a voltage step-up path from said first tube to said second tube for rendering the said second tube inoperative during a portion of the cycle in peak positive modulation, $E_i$ represents the instantaneous radio frequency voltage and $E_m$ is the maximum peak radio frequency voltage.

6. In a system for supplying amplified super-audible electric waves modulated at a lower rate, in combination, a plurality of vacuum tubes having their input circuits fed in phase from a common source, said tubes having their output circuits coupled together, a load circuit fed by said tubes, means for causing a first part only of said tubes to deliver power, during negative modulation, substantially proportional to $$\left(\frac{E_i}{E_m}+1\right)^2$$

where $E_i$ is negative, and for causing both parts of said tubes to deliver power, substantially proportional to $$\left(\frac{E_i}{E_m}+1\right)^2$$

where $E_i$ is positive, when modulation is positive, and controlled by the amount of power to be delivered, said first mentioned tube delivering only a minor portion of the power output when modulation is positive, said means comprising means for applying a bias to said first part of said tubes, means for increasing said bias negatively for negative modulation, means for applying a cut-off bias to another portion of said tubes during negative modulation and means for applying a cut-off voltage to the plate of the first part of said tubes during each cycle in peak positive modulation, $E_i$ represents the instantaneous radio frequency voltage and $E_m$ is the maximum peak radio frequency voltage.

7. In a system for supplying amplified super-audible frequency electric waves modulated at a lower rate, in combination, a plurality of tubes having a common input circuit delivering input voltage in the same phase to said tubes, said tubes requiring different impedances, a common power driven circuit associated with said tubes to be driven thereby, and connections from said tubes to different points of said driven circuit for properly relating the impedance of said circuit as seen from the plates of said tubes.

8. In a system for supplying amplified super-audible frequency electric waves modulated at a lower rate, in combination, a plurality of tubes having a common input circuit delivering input voltage in the same phase to said tubes, said tubes requiring different impedances, a power driven circuit associated with one of said tubes to be driven thereby and having substantially the impedance required by said tube, and means for coupling said driven circuit to another of said tubes and for reducing the impedance of said circuit as seen from the plate of said tube.

9. In a system for delivering electric waves to a load circuit, in combination, a pair of vacuum tubes having a common input circuit delivering input voltage in the same phase to said tubes, said tubes requiring different plate load impedances in order to deliver unequal relative proportons of plate power output, a common output circuit fed by said tubes, and means for relating the impedance of said load circuit to said tubes in such manner as to obtain the required impedances.

10. In a system for supplying amplified super-audible frequency electric waves modulated at a lower rate, in combination, an input circuit delivering input voltage in the same phase to said tubes, a plurality of tubes supplied in phase from said input circuit, said tubes having their plate circuits coupled to each other, an output circuit to be supplied by said tubes, said tubes having different power delivery capabilities, and connections from said tubes to said output circuit so arranged that the impedance presented by said circuit to said tubes will be different.

11. In a system for supplying amplified super-audible frequency electric waves modulated at a lower rate, in combination, a plurality of vacuum tubes having a common input circuit, said tubes having their plate circuits coupled together, a common load circuit driven by said tubes, means for causing one of said tubes to deliver substantially its full power for zero modulation, and means for causing said tubes to deliver less power for negative modulation, means for biasing another of said tubes to cut off at or about zero modulation, whereby on positive modulation said tube delivers power, and connections between the plate circuits of said tubes for causing the plate voltage of the first tube to move in a negative direction with respect to its cathode when the second tube begins to pass plate current.

ALEXANDER SENAUKE.